Figure 1:
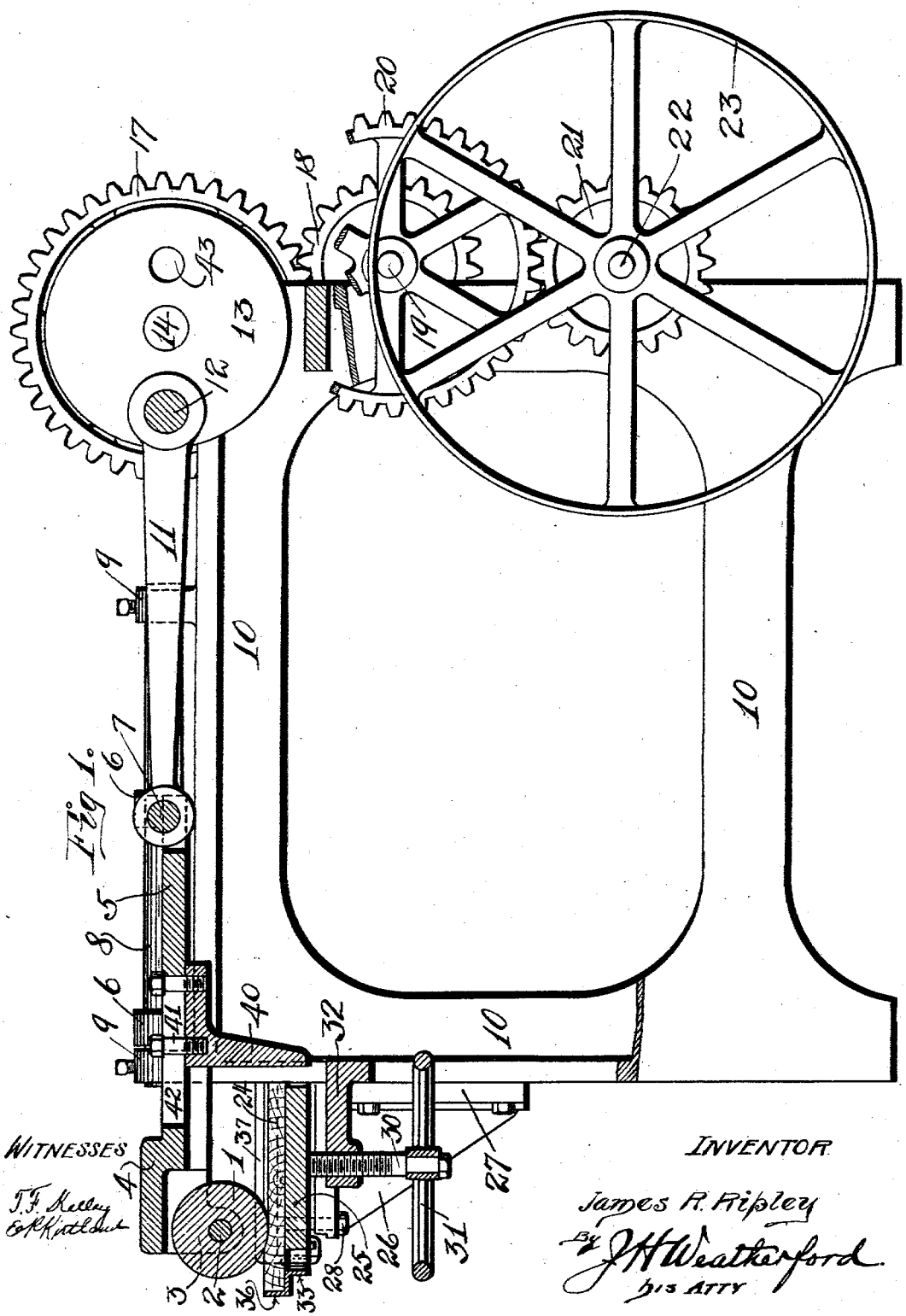

No. 694,992. Patented Mar. 11, 1902.
J. R. RIPLEY.
MACHINE FOR IMPRESSING BOX MATERIAL.
(Application filed Dec. 24, 1901.)
(No Model.)
2 Sheets—Sheet 1.

WITNESSES
J. F. Kelley
E. P. Kirtland

INVENTOR
James R. Ripley
By J. H. Weatherford
his ATTY

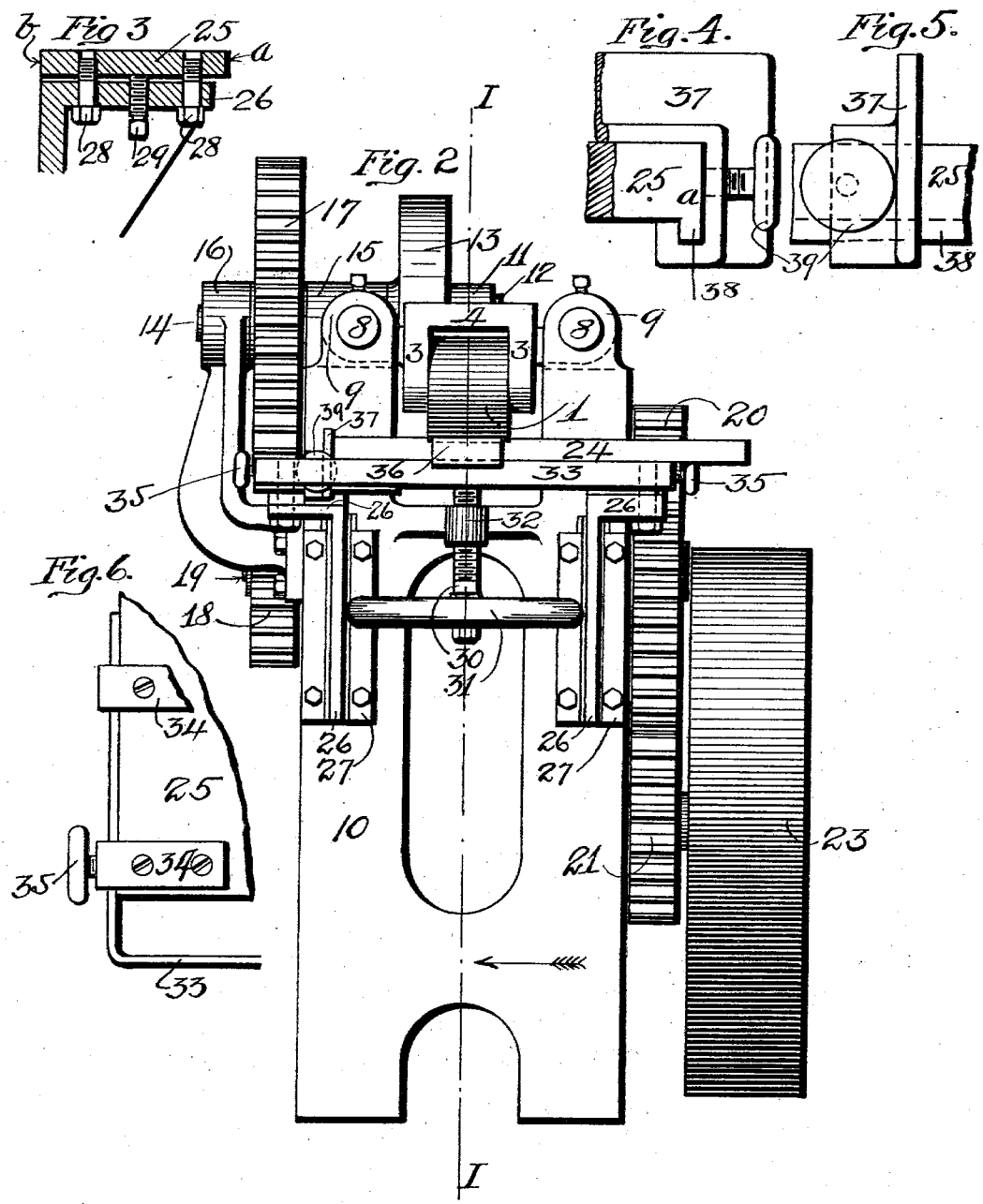

UNITED STATES PATENT OFFICE.

JAMES R. RIPLEY, OF MEMPHIS, TENNESSEE.

MACHINE FOR IMPRESSING BOX MATERIAL.

SPECIFICATION forming part of Letters Patent No. 694,992, dated March 11, 1902.

Application filed December 24, 1901. Serial No. 87,131. (No model.)

*To all whom it may concern:*

Be it known that I, JAMES R. RIPLEY, a citizen of the United States, residing at Memphis, Shelby county, State of Tennessee, have invented certain new and useful Improvements in Machines for Impressing Box Material, of which the following is a specification.

My invention relates to certain new and useful improvements in machines for impressing box material, and has especial reference to machines in which a traveling roller devoid of cutters is used to impress a plain groove in box material.

The object of my invention is to provide a machine for impressing in box material such as is used for plug-tobacco or the like a shallow groove in which to paste the internal-revenue stamp required by law in such cases. I accomplish this object, as will be more fully hereinafter set forth in the drawings, specification, and claims.

In the drawings, Figure 1 is a sectional side elevation taken on the center line I I of Fig. 2, except that the lower part of the frame and driving-pulley and gears thereon are shown in elevation. Fig. 2 is an end elevation of the machine. Figs. 3, 4, 5, and 6 are views of details which will be more fully hereinafter described.

Referring now to the drawings, in which like numerals refer to the same or like parts in all the views, 1 is the impressing-roller, of metal, preferably steel, journaled on a pin 2, which is fastened in lugs 3 3, extending downward from the overhanging end 4 of a cross-head 5. 6 6 are the cross-head bearings, and 7 the cross-head pin. This cross-head 5 slides on guides 8 8, which I prefer to make of plain rods, as shown, fastened in lugs 9 9, extending upward from the bed or frame 10 of the machine. The cross-head 5 and impressing-roller 1 carried by it are reciprocated through a connecting-rod 11 by a crank-pin 12, carried by a crank-disk 13.

14 is the crank-shaft, which is journaled in bearings 15 and 16, attached to the frame 10, and carries a gear 17, which is driven by a pinion 18. The pinion 18 is fastened to a shaft 19, which is journaled in bearings attached to the end of the frame 10 of the machine and which extends across the end of said frame and carries on its opposite end a gear 20, which in turn is driven by a pinion 21 on the same shaft 22 as the driving-pulley 23.

The material to be operated on, 24, generally in the shape of a small rectangular board, is supported by a table 25, which is guided and steadied by brackets 26, which slide in guides 27 on the front end of the frame 10. These brackets 26 are adjustably fastened to the table 25 (see Fig. 3) by two cap-screws 28 and a set-screw 29, which screws permit the front of the table *a* to be raised or lowered relatively to the back *b* or the entire end of the table over the bracket to be adjusted vertically relative to same. Both table 25 and brackets 26 may be bodily raised or lowered for different thicknesses of material by means of a screw 30 and a hand-wheel 31, the said screw 30 being carried by a bracket 32, integral with (bolted to) the frame 10. The position of the material 24 on the table is gaged by a front gage 33, (see also Fig. 6, which is an enlarged detail of one corner of the table 25,) which extends entirely across the table and around the ends of same and is held at the ends by straps 34 34, through which it may be slipped, and set-screws 35, which when tightened prevent any movement. This gage 33 comes flush with the top of the table 25 only, but has immediately in the path of the impressing-roller 1 an extension 36, preferably in the shape of an L, both outward and upward, against which extension the material 24 rests. The position of the material longitudinally of the table is regulated by a gage 37, (see also Figs. 4 and 5, which show an enlarged view of same,) which rests on the upper surface of the table 25 and extends around the front edge *a* of same and is held in place by a strip 38, extending along the front *a* beneath the table, which strip the gage embraces and on which it slides.

39 is a set-screw, which is tightened to hold the gage in place.

In some cases it is necessary to impress the edges of the box material as well as the face of same. For such cases I provide a bracket 40, fastened to the under side of the cross-head 5 by cap-screws 41, which slide in a slot 42 in the said cross-head, so that the bracket 40 may be placed out of the way when not in use. This slot, too, is used in cases where it is desired to shorten the stroke of the machine for narrow material or short grooves, it being thus possible to impress a groove in the edge with any length of stroke. 43 is an additional hole in the crank-disk to illustrate the method of shortening the stroke. This bracket, it will be noted, operates just at the moment when the crank-pin is passing the dead-center, so that ample force is secured to make the impression.

In operation the box material 24 is placed on the table 25 against both gages 34 and 37 as the impressing-roller is moved back by the driving mechanism, on the forward movement of the roller it passes over the material and impresses a shallow groove in same. If desired, the bracket 40 is set forward and the edge impressed at the same time.

Having now fully described my invention, what I claim, and desire to secure by Letters Patent of the United States, is—

1. In a groove-impressing machine, the combination with a supporting-table, of a smooth roller and means of reciprocating said roller over said table substantially as shown and described.

2. In a groove-impressing machine, the combination with a supporting-table and means of adjusting same, of a smooth roller and means of reciprocating same over said table, substantially as shown and described.

3. In a groove-impressing machine, the combination with a suitable frame, and a supporting-table carried thereby, of a reciprocating cross-head, a roller journaled in said cross-head, and means of reciprocating said cross-head, substantially as shown and described.

4. In a groove-impressing machine, the combination with a suitable frame, a supporting-table carried thereby and means of adjusting said table, of a reciprocating cross-head, a roller journaled in said cross-head, and means of reciprocating said cross-head, substantially as shown and described.

5. In a groove-impressing machine, the combination with a suitable frame, a supporting-table adjustably mounted in guides on said frame, a bracket extending outward from said frame, and a screw through said bracket to adjust the height of said table, of a reciprocating cross-head, a roller journaled in said cross-head, and means of reciprocating said cross-head, substantially as shown and described.

6. In a groove-impressing machine, the combination with a suitable frame, and a supporting-table carried thereby of cross-head guides on said frame, a cross-head mounted on said guide, a roller journaled in said cross-head and means of reciprocating said cross-head, substantially as shown and described.

7. In a groove-impressing machine, the combination with a suitable frame, a supporting-table adjustably mounted in guides on said frame, a bracket extending outward from said frame, and a screw through said bracket to adjust the height of said table of cross-head guides on said frame, a cross-head mounted on said guides, a roller journaled in said cross-head and means of reciprocating said cross-head, substantially as shown and described.

8. In a groove-impressing machine, the combination with a suitable frame, a supporting-table carried thereby and means of adjusting said table, of cross-head guides on said frame, a cross-head mounted on said guides, a roller journaled in said cross-head and means of reciprocating said cross-head, substantially as shown and described.

9. In a groove-impressing machine, the combination with a suitable frame, a supporting-table adjustably mounted thereon, and means of regulating the height of said table, of adjustable gages on said table and a smooth roller and means of reciprocating same over said table, substantially as shown and described.

10. In a groove-impressing machine the combination with a suitable frame, and a supporting-table carried thereby, of cross-head guides on said frame, a cross-head mounted on said guides, a roller journaled in said cross-head, a bracket adjustably fastened to said cross-head and extending downward therefrom, and means of reciprocating said cross-head, substantially as shown and described.

11. In a groove-impressing machine, the combination with a suitable frame, a supporting-table carried thereby and means of adjusting said table, of cross-head guides on said frame, a cross-head mounted on said guides, a roller journaled in said cross-head, a bracket adjustably fastened to said cross-head and extending downward therefrom, and means of reciprocating said cross-head, substantially as shown and described.

12. In a groove-impressing machine, the combination with a suitable frame, a supporting-table adjustably mounted in guides on said frame, a bracket extending outward from said frame, and a screw through said bracket to adjust the height of said table, of cross-head guides on said frame, a cross-head mounted on said guides, a roller journaled in said cross-head, a bracket adjustably fastened to said cross-head and extending downward therefrom and means of reciprocating said cross-head, substantially as shown and described.

In testimony whereof I have signed my name to this specification in the presence of two subscribing witnesses.

JAMES R. RIPLEY.

Witnesses:
GEO. E. NEUHARDT,
J. R. FLIPPIN.